US009829770B1

(12) United States Patent
Gustaveson, II

(10) Patent No.: US 9,829,770 B1
(45) Date of Patent: Nov. 28, 2017

(54) CAMERA OBSTRUCTING DEVICE

(71) Applicant: SOL PALS, LLC, Draper, UT (US)

(72) Inventor: Ronald Glen Gustaveson, II, Draper, UT (US)

(73) Assignee: SOL PALS, LLC, Draper, UT (US)

( * ) Notice: Subject to any disclaimer, the term of this patent is extended or adjusted under 35 U.S.C. 154(b) by 0 days.

(21) Appl. No.: 15/433,151

(22) Filed: Feb. 15, 2017

Related U.S. Application Data

(63) Continuation-in-part of application No. 29/564,477, filed on May 13, 2016, and a continuation-in-part of application No. 29/585,474, filed on Nov. 23, 2016, which is a continuation-in-part of application No. 29/567,669, filed on Jun. 10, 2016.

(51) Int. Cl.
 G03B 11/04 (2006.01)
 H04N 5/225 (2006.01)
 H04N 5/232 (2006.01)

(52) U.S. Cl.
 CPC ......... G03B 11/048 (2013.01); H04N 5/2251 (2013.01); H04N 5/23203 (2013.01)

(58) Field of Classification Search
 CPC .................................................. G03B 11/048
 See application file for complete search history.

(56) References Cited

U.S. PATENT DOCUMENTS

| D189,894 S | 3/1961 | Lang |
|---|---|---|
| D219,714 S | 1/1971 | Crestin-Billet |
| D342,262 S | 12/1993 | Hester |
| D371,508 S | 7/1996 | Sagol |
| D390,423 S | 2/1998 | Stivender |
| 5,801,919 A | 9/1998 | Griencewic |
| D435,547 S | 12/2000 | Reed |
| D498,787 S | 11/2004 | Nelms |
| 6,812,958 B1 | 11/2004 | Silvester |
| D501,111 S | 1/2005 | Lan |
| 7,061,536 B2 | 6/2006 | Cha |

(Continued)

FOREIGN PATENT DOCUMENTS

| CN | 201114394 | 9/2008 |
|---|---|---|
| CN | 101980099 | 2/2011 |

(Continued)

OTHER PUBLICATIONS

Notice of Allowance for U.S. Appl. No. 29/520,343 dated Jun. 29, 2016.

(Continued)

*Primary Examiner* — W B Perkey
(74) *Attorney, Agent, or Firm* — Workman Nydegger

(57) ABSTRACT

Embodiments are directed to systems and methods for obstructing or preventing light from reaching a light detecting portion of a camera. In one scenario, a camera obstructing device is described which includes the following: a structural housing that provides support for an obstructing member. The structural housing has at least one channel on which the obstructing member slides from one position to another position. The obstructing member substantially prevents light from reaching the light sensor of the camera. At least one magnet is positioned within the structural housing, where the magnet holds the obstructing member in place in the initial position or the other position.

21 Claims, 11 Drawing Sheets

(56) References Cited

U.S. PATENT DOCUMENTS

| | | | |
|---|---|---|---|
| D532,240 S | 11/2006 | Pressier | |
| D532,640 S | 11/2006 | Pressier | |
| 7,239,806 B2 | 7/2007 | Chen | |
| 7,431,983 B2 | 10/2008 | Amano | |
| 7,435,018 B2 | 10/2008 | Huang | |
| 7,438,486 B2 | 10/2008 | Ho | |
| 7,563,040 B2 | 7/2009 | Tsai | |
| 7,581,893 B2 | 9/2009 | Miramontes | |
| D611,333 S | 3/2010 | Sanders | |
| 7,677,815 B2 | 3/2010 | Garcia | |
| D628,774 S | 12/2010 | Sykes | |
| D633,507 S | 3/2011 | Nelson | |
| D638,526 S | 5/2011 | Newman | |
| 7,964,259 B2 | 6/2011 | Koshu | |
| 7,973,856 B2 | 7/2011 | Lee | |
| D643,457 S | 8/2011 | DeLong | |
| D650,408 S | 12/2011 | Kim | |
| D659,403 S | 5/2012 | Lerman | |
| 8,242,924 B2 | 8/2012 | Huang | |
| D669,112 S | 10/2012 | Gustaveson | |
| 8,471,956 B2 | 6/2013 | Fortman | |
| 8,496,390 B2 | 7/2013 | Ohuchi | |
| D708,248 S | 7/2014 | Son | |
| D708,657 S | 7/2014 | Gustaveson | |
| 8,780,205 B2 | 7/2014 | Boutell | |
| D718,803 S | 12/2014 | Smith | |
| D720,382 S | 12/2014 | Szarawarski | |
| D721,396 S | 1/2015 | Gustaveson | |
| D740,773 S | 10/2015 | Bang | |
| D745,469 S | 11/2015 | Farnum | |
| 9,197,850 B2 | 11/2015 | Koberling | |
| 9,305,538 B2 | 4/2016 | Tyson | |
| D756,443 S | 5/2016 | Ju | |
| D759,645 S | 6/2016 | Penn | |
| D760,677 S | 7/2016 | Tsushima | |
| D763,843 S | 8/2016 | Gustaveson | |
| D764,474 S | 8/2016 | Penn | |
| 9,465,276 B2 * | 10/2016 | Jonsson | G06F 1/1656 |
| D782,562 S | 3/2017 | Gustaveson | |
| 2005/0068423 A1 | 3/2005 | Bear et al. | |
| 2009/0252487 A1 | 10/2009 | Matsumoto | |
| 2009/0284635 A1 | 11/2009 | Sung | |
| 2010/0102979 A1 * | 4/2010 | Huang | G06F 1/1686 340/686.1 |
| 2011/0058255 A1 | 3/2011 | Weiss | |
| 2011/0115924 A1 * | 5/2011 | Yu | G06F 1/1605 348/207.11 |
| 2011/0182029 A1 * | 7/2011 | Wu | G06F 1/1686 361/679.55 |
| 2013/0088639 A1 | 4/2013 | Mundt | |
| 2014/0220269 A1 | 8/2014 | Ogufere | |
| 2015/0015777 A1 | 1/2015 | Osbourne | |
| 2015/0059251 A1 | 3/2015 | Rinner | |
| 2016/0105598 A1 * | 4/2016 | Zeira | H04N 5/23203 348/143 |
| 2016/0142594 A1 | 5/2016 | Luttrell | |
| 2016/0161830 A1 * | 6/2016 | Gonzalez Sanchez | G06F 1/1686 396/448 |
| 2016/0323491 A1 * | 11/2016 | Al Marzouqi | H04N 5/232 |

FOREIGN PATENT DOCUMENTS

| | | |
|---|---|---|
| EM | 003566330-0001 | 1/2017 |
| ES | 1076643 | 4/2012 |
| ES | 1077518 | 8/2012 |
| JP | 2001309003 | 11/2001 |
| JP | 2003289358 | 10/2003 |
| JP | 2004055630 | 2/2004 |
| JP | 2004072436 | 3/2004 |
| JP | 2004275434 | 10/2004 |
| JP | 2004309964 | 11/2004 |
| JP | 2005227445 | 8/2005 |
| JP | 2005275074 | 10/2005 |
| JP | 2005323049 | 11/2005 |
| JP | 2005345576 | 12/2005 |
| JP | 2009271407 | 11/2009 |
| JP | 2010210936 | 9/2010 |
| KR | 20040070899 | 8/2004 |
| KR | 20050015787 | 2/2005 |
| KR | 200405362 | 1/2006 |
| KR | 20060106527 | 10/2006 |
| KR | 100640798 | 11/2006 |
| KR | 20100003957 | 1/2010 |
| KR | 20100003957 | 4/2010 |
| WO | 2009137600 | 11/2009 |

OTHER PUBLICATIONS

Notice of Allowance for U.S. Appl. No. 29/548,560 dated Nov. 27, 2016.

Webcam Cover Black. [online] Published date unknown. Retrieved on Oct. 28, 2016 from <URL:http://thewebcamcovers.com/shop/webcamcover-black/>.

Notice of Allowance for U.S. Appl. No. 29/385,909 dated Aug. 29, 2012.

"http://webcamcovers.blogspot.com/2012/09/c-slide-webcam-cover-patent-recieves.html Company Release: Sep. 18, 2012Retrieved on: Feb. 26, 2014".

"http://www.amazon.com/Webcam-Cover-Laptops-Pad-Devices/dp/B004ZOXSY6/ref=sr_1_2?s=electronics &ie=UTF88(qid=1393520771&sr=1-2 &keywords=webcam+covers Availableon Amazon beginning May 3, 2011 Retrieved on: Feb. 26, 2014".

"http://www.ebay.com/itm/Webcam-Cover-also-known-as-web-cam-shutter-webcam-shutter-fits-all-laptops-/160917145450#ht_2076wt_1358 on E-Bay beginning Jan. 26, 2012 Retrieved on: Feb. 26, 2014".

Notice of allowance for U.S. Appl. No. 29/433,900 dated Mar. 10, 2014.

Ex Parte Quayle Action for U.S. Appl. No. 29/473,247 dated Aug. 5, 2014.

Restriction Requirement in U.S. Appl. No. 29/564,477 dated May 16, 2017.

PM: Webcam-Cover des Start-ups Privoo ab Juli im Handel. [online] published date Apr. 24, 2017. Retrieved on Apr. 29, 2017 from <URL:http://unternehmen-heute.de/news.php?newsid=426363>.

Swivel Webcam Cover silver.[online] published date unknown. Retrieved on Apr. 29, 2017 from ,URL:http://www.intraco.nl/en/verkoop-andere-producten/swivel-webcam-cover-silver/>.

Early Spyslide 1-Pack Indiegogo Price. [online] published date unknown. Retrieved on Apr. 29, 2017 from <URL:https://spyfy.com/product/spyslide-webcam-cover-1-pack-indiegogo/?lang=en>.

*Ex Parte Quayle* Action for U.S. Appl. No. 29/585,474 dated Jul. 13, 2017.

*Ex Parte Quayle* Action for U.S. Appl. No. 29/567,669 dated Jul. 12, 2017.

Webcamcover 2.0 black. [online] Oublished date unknown. Retrieved on Jun. 12, 2017 from <URL:https://thewebcamcovers.com/product/webcamcover-2-0-black/>.

"Screen Cleaner Pad for Mobile Phones AllAccessories", Publish Date: Sep. 12, 2011, Access Date: Sep. 26, 2017 from https://www.youtube.com/watch?v=7TFo1-ceStJw>.

"DigiClean Plus Microfiber Screen Cleaners", Publish Date: Aug. 30, 2011, Access Date: Sep. 26, 2017, from <https://www.youtube.com/watch?v=-LWFp8Z-fzA>.

"DigiClean Plus Mobile Phone Screen Cleaner / Wipe Stickers", Publish Date: Jun. 29, 2012, Access Date: Sep. 26, 2017, from <https://www.youtube.com/watch?v=EHK9UWFUGa0>.

* cited by examiner

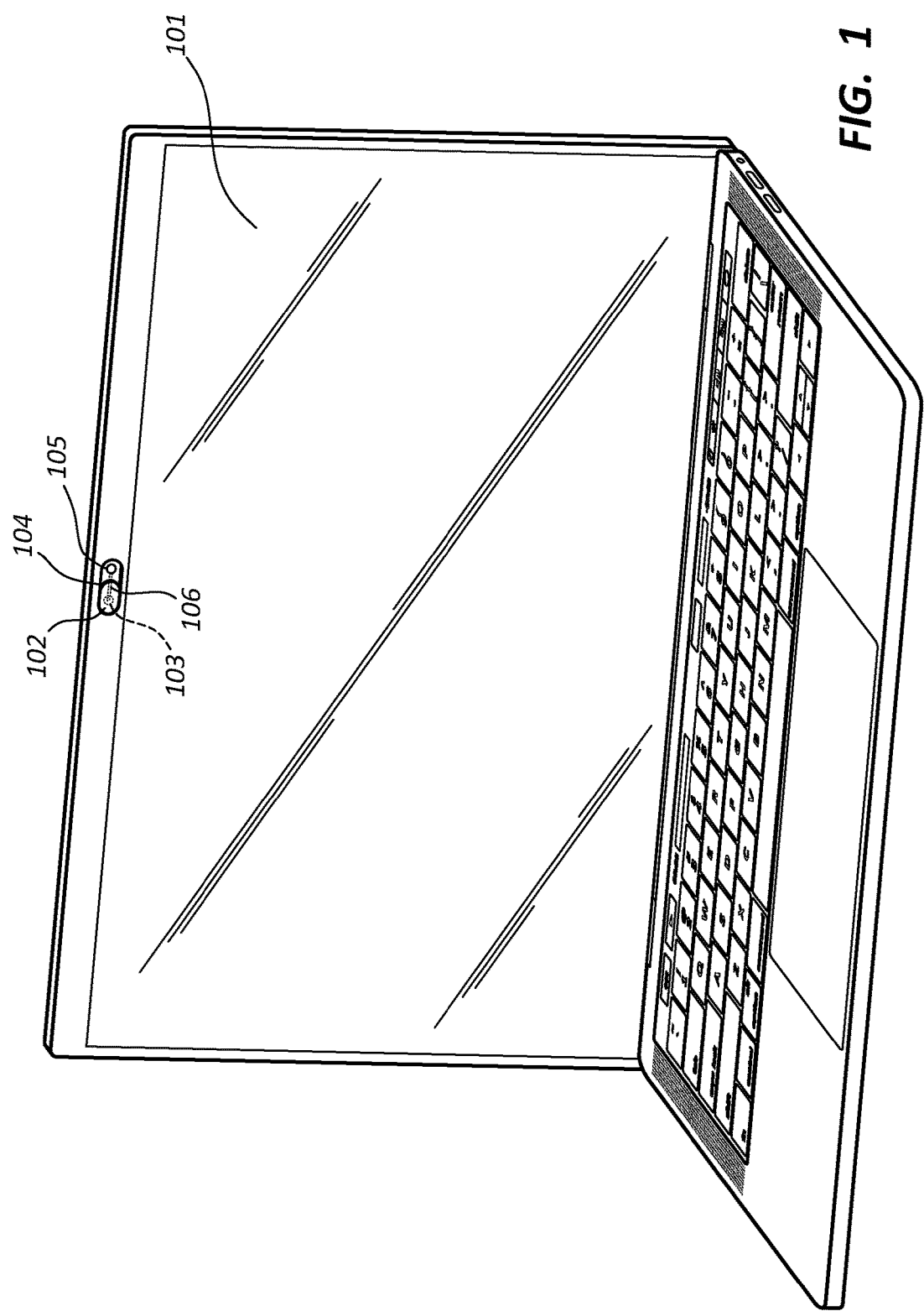

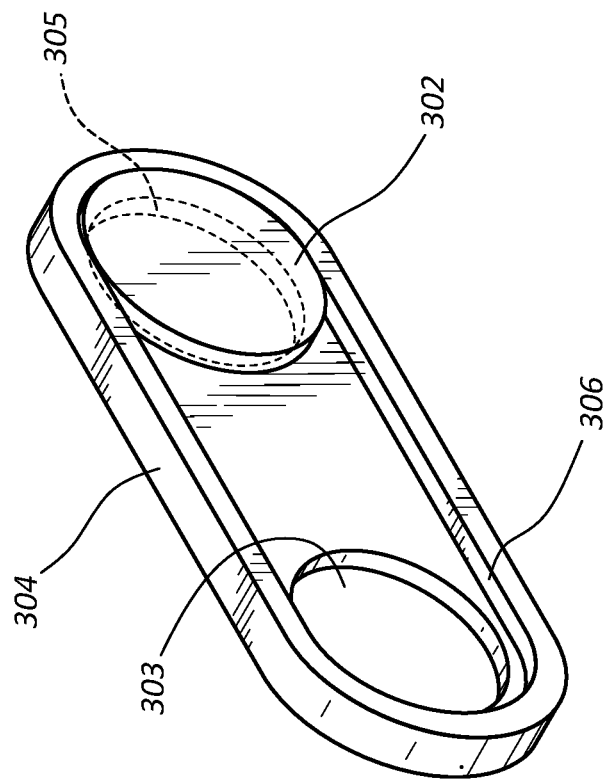
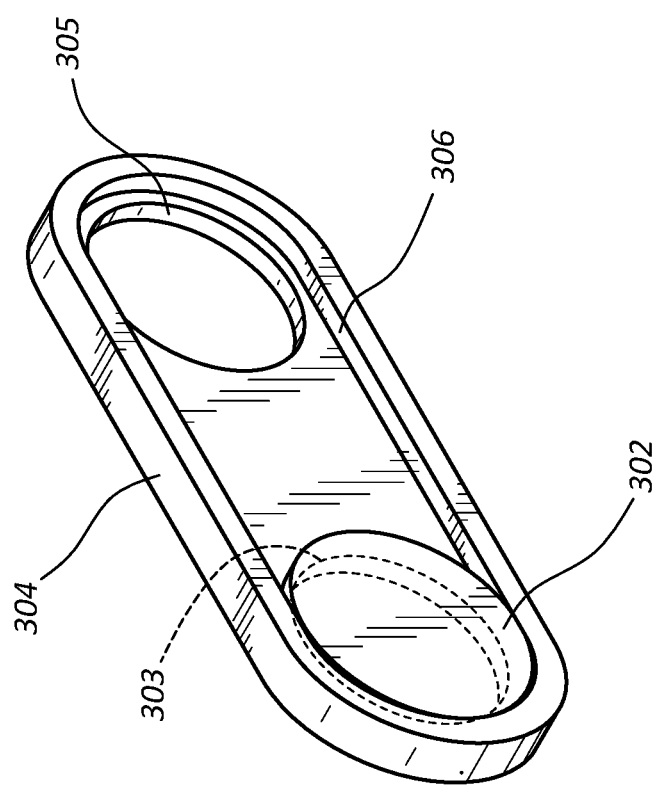
FIG. 3A
FIG. 3B

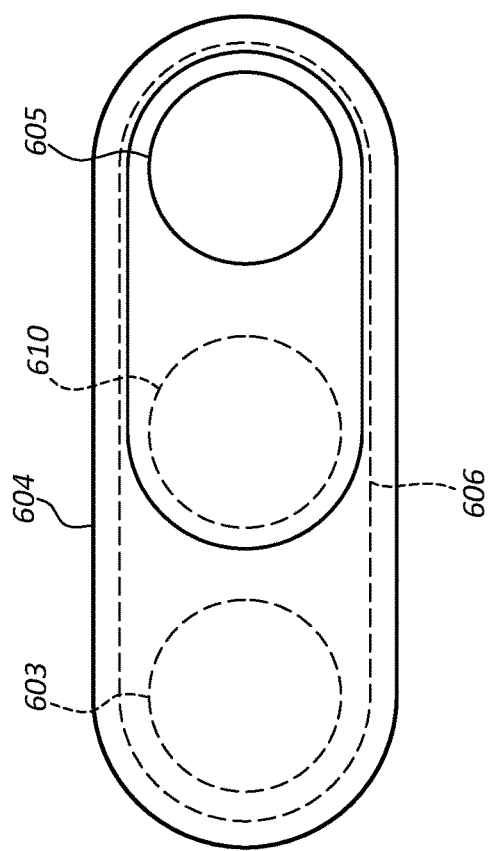
FIG. 6
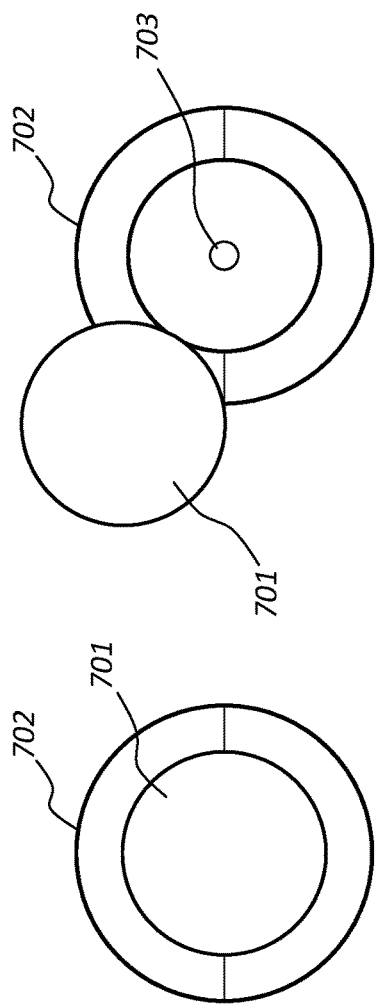
FIG. 7A
FIG. 7B

CAMERA OBSTRUCTING DEVICE

CROSS-REFERENCE TO RELATED APPLICATIONS

This application is a continuation-in-part of and claims priority to U.S. Design application Ser. No. 29/564,477, entitled "Webcam Cover," filed on May 13, 2016, U.S. Design application Ser. No. 29/585,474, entitled "Webcam Cover," filed on Nov. 23, 2016, and U.S. Design application Ser. No. 29/567,669, entitled "Sliding Webcam Cover," filed on Jun. 10, 2016, each of which is incorporated by reference herein in its entirety.

BACKGROUND

Computing systems have become highly integrated in the workforce, in the home, in mobile devices, and many other places. Many computing systems, such as laptops, mobile phones, televisions and wearable devices come equipped with cameras. These cameras allow for many different useful features including taking pictures, recording videos, video conferencing and other features. As such, embedding cameras into electronic devices has become commonplace.

In some instances, however, the cameras embedded in these devices may be operated without the owner's knowledge. Indeed, malicious users may be able to execute software code on an unsuspecting user's device that allows the malicious user to control one or more of the electronic device's features, including the camera. In cases where this malicious software is installed on an electronic device, that device may be turned on surreptitiously, and may begin transmitting a video or photo feed to a remote destination (e.g. via WiFi or a cellular connection). Thus, a user's device may be video recording them or taking pictures of them without their permission and without their knowledge. This may lead to the public release of photographs or videos that were taken against the user's will.

If the user discovers the malicious software running on their device (e.g. via anti-virus software or by seeing a "camera on" indicator light), the user can take steps to turn the camera off and uninstall the malicious software. However, in many cases, the software is designed to run the camera in a stealth mode that does not initialize the "camera on" light. As such, the user may not know that they have any cause for concern, and may be entirely unaware that their camera is videoing or taking pictures of them. In some cases, this may go on for an extended amount of time. Many users are shocked to learn that such surreptitious use of their cameras is possible. However, such use is not only possible with current electronic devices, it has become commonplace.

BRIEF SUMMARY

Embodiments described herein are directed to systems and methods for obstructing or preventing light from reaching a light detecting portion of a camera. In one embodiment, a camera obstructing device is described which includes the following: a structural housing that provides support for an obstructing member. The structural housing has at least one channel on which the obstructing member slides from one position to another position. The obstructing member substantially prevents light from reaching the light sensor of the camera. At least one magnet is positioned within the structural housing, where the magnet holds the obstructing member in place in the initial position or the other position.

In another embodiment, a method is provided for preventing light from reaching a light detecting portion of a camera. The method includes fastening a housing structure over a lens portion of the camera. The housing structure provides support for an obstructing member, and has at least one channel on which the obstructing member slides from a first position to a second position. The method next includes causing the obstructing member to slide on the channel substantially over the lens portion of the camera into the second position. The method then includes initializing the camera to begin capturing light at the lens and accessing camera feed data to verify that light is being prevented from reaching the lens portion of the camera.

In another embodiment, a camera obstructing device is described which includes the following: a structural housing that provides support for an obstructing member. The structural housing has at least one rotatable fastener which fastens the obstructing member to the structural housing, and on which the obstructing member pivots from a first position to a second position. The obstructing member substantially prevents light from reaching the light sensor of the camera. At least one magnet is positioned within the structural housing, where the magnet holds the obstructing member in place in the first position.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which:

FIG. 1 illustrates an embodiment of a camera obstructing device installed on a laptop computer.

FIG. 3A illustrates an embodiment of a camera obstructing device having a round obstructing member in the open position.

FIG. 3B illustrates an embodiment of a camera obstructing device having a round obstructing member in the closed position.

FIG. 6 illustrates an embodiment of a camera obstructing device having multiple magnets.

FIG. 7A illustrates a peephole embodiment of a camera obstructing device in the closed position.

FIG. 7B illustrates a peephole embodiment of a camera obstructing device in the open position.

DETAILED DESCRIPTION

Figure 2A:
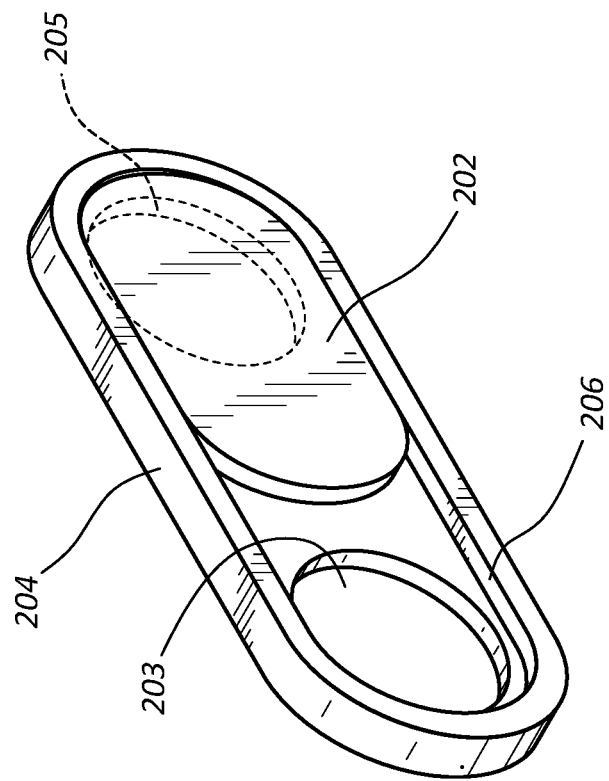
FIG. 2A illustrates an embodiment of a camera obstructing device having an oblong obstructing member in the open position.

Embodiments described herein are directed to systems and methods for obstructing or preventing light from reaching a light detecting portion of a camera. In one embodiment, a camera obstructing device is described which includes the following: a structural housing that provides support for an obstructing member. The structural housing has at least one channel on which the obstructing member slides from one position to another position. The obstructing member substantially prevents light from reaching the light sensor of the camera. At least one magnet is positioned within the structural housing, where the magnet holds the obstructing member in place in the initial position or the other position.

In another embodiment, a method is provided for preventing light from reaching a light detecting portion of a camera. The method includes fastening a housing structure over a lens portion of the camera. The housing structure provides support for an obstructing member, and has at least one channel on which the obstructing member slides from a first position to a second position. The method next includes causing the obstructing member to slide on the channel substantially over the lens portion of the camera into the second position. The method then includes initializing the camera to begin capturing light at the lens and accessing camera feed data to verify that light is being prevented from reaching the lens portion of the camera.

In another embodiment, a camera obstructing device is described which includes the following: a structural housing that provides support for an obstructing member. The structural housing has at least one rotatable fastener which fastens the obstructing member to the structural housing, and on which the obstructing member pivots from a first position to a second position. The obstructing member substantially prevents light from reaching the light sensor of the camera. At least one magnet is positioned within the structural housing, where the magnet holds the obstructing member in place in the first position.

It should be noted that system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Referring to the figures, FIG. 1 illustrates a laptop computer 101 on which at least one embodiment described herein may be employed. Indeed, it should be recognized that the laptop computer 101 is just one example of a computing device on which the embodiments herein may be used. For instance, the camera obstructing devices described herein may be installed on or affixed to substantially any type of electronic device that has a camera device including a mobile phone, a television, a wearable device, an appliance such as a refrigerator, a desktop computer or any other device including a standalone camera device. While most of the embodiments described herein are non-automated (i.e. manually actuated), it will be understood that in at least some cases, the obstructing member of the camera obstructing device may be actuated via a solenoid according to an input signal, as will be explained further below.

Figure 2B:
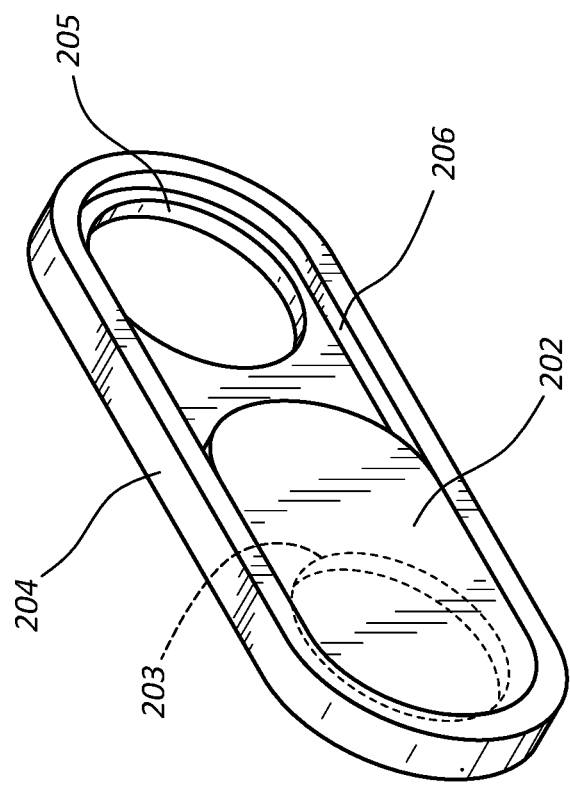
FIG. 2B illustrates an embodiment of a camera obstructing device having an oblong obstructing member in the closed position.

A camera obstructing device 100 of FIG. 1 includes a structural housing 104 that provides support for an obstructing member 102. The structural housing 104 has at least one channel 106 on which the obstructing member 102 slides from a first position to a second position (as shown in FIGS. 2A and 2B). When placed over a camera lens, the obstructing member 102 substantially prevents light from reaching a light sensor of the camera. The camera obstructing device 100 also includes at least one magnet 103 positioned within the structural housing 104. The magnet 103 is configured to hold the obstructing member 102 in place in the first position or the second position.

Thus, as shown in FIG. 2A, when the obstructing member 202 is placed over the magnet 203, the camera obstructing device 200 is in a first, open position in which light can reach through the hole 205 to the light sensor of a camera. When the obstructing member 202 is placed over the hole 205, the camera obstructing device 200 is then in a second, closed position in which light cannot reach the light sensor of the camera. Tracks, guides or channels 206 may be used to hold the obstructing member in place within the device, and may allow the obstructing member 202 to be slid between the open position and the closed position.

The obstructing member 202 may be substantially any shape or size, and may be configured to block some or all of the view from the camera. As shown in FIGS. 3A and 3B, the obstructing member 302 may be circular shape. The circular obstructing member 302 may be made of a ferrous metal that attaches to (or is held in place by) magnet 303. The circular obstructing member 302 may then be slid along channels 306 into a closed position over the hole 305 that allows light to reach the camera (e.g. 105 of FIG. 1). When in the closed position, light is prevented from reaching the camera. As such, even if the camera is actuated without the knowledge of the user, the camera cannot function as intended as no light reaches the lens. Thus, any surreptitious activation of the camera will be rendered useless.

Although shown as circular in FIGS. 2A-3B, the magnet 203/303 may be substantially any shape or size. Indeed, in the camera obstruction device of FIG. 2A, the magnet 203 may be oblong, and may be shaped similar to or the same as the oblong obstruction member 202. The magnet 203 may be positioned to lock or snap the obstruction member into place in the open position. Thus, once the obstruction member begins to slide away from the closed position, the magnet 203 may grab the obstruction member 202 and lock it in place in the open position. The magnet may be designed with a thickness that is sufficient to hold the obstruction member in place, but thin enough to reduce the weight of the overall device.

The magnet 203 may also be designed to hold the obstructing member 202 within the channel 206. The magnet 203 may be formed of strips or pieces that magnetically hold the obstruction member 202 against the channel 206. Theses magnetic strips are strong enough to hold the obstruction member against the structure of the device 204, but weak enough to allow the obstruction member to be moved along the channel 206. In some embodiments, the device structure 204 may be designed with an outer lip that prevents the obstruction member from falling out. The outer lip also allows movement of the obstruction member 202 from the open position to the closed position. In cases where an outer lip is implemented, the magnet 203 used may be thinner or smaller, thus reducing the weight of the camera obstructing device.

Figure 4A:
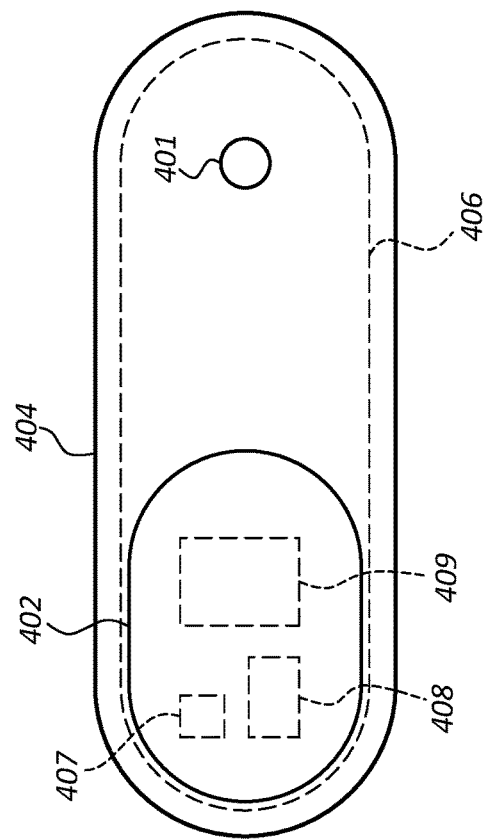
FIG. 4A illustrates an embodiment of a camera obstructing device having an antenna, an actuating member and a battery, where the obstructing member is in the open position.

In some embodiments, the obstructing member may be actuated by hand. That is, a user may physically move the obstructing member from the open position to the closed position, or vice versa. In other embodiments, the obstructing member may be actuated mechanically or electrically. For instance, as shown in FIG. 4A, the obstructing member 402 may have a solenoid 408 installed thereon. When activated, the solenoid moves the obstructing member 402 from the open position to the closed position, or from the closed position to the open position. The solenoid 408 may be powered by a battery 409 or by a wired power source (e.g. from the electronic device). The battery may be installed on the obstructing member 402, or may be installed elsewhere on the camera obstructing device support structure 404. The solenoid 408 may be actuated via a wired or wireless signal.

For example, the camera obstructing device may include an antenna 407 configured to receive wireless signals. The antenna 407 may thus receive an initiating wireless signal, and trigger activation of the solenoid upon reception of the signal. The wireless signal may be received over WiFi, Bluetooth, infrared or some other waveform. The wireless signal may, for example, be sent out from a phone or from a wearable device. A user of a laptop (e.g. 101 of FIG. 1) may thus use a wearable electronic device such as a watch to send a signal to the camera obstructing device indicating that the obstructing member is to be actuated and moved from an open to a closed position, or vice versa. The camera obstructing device may also include a microcontroller configured to determine the open or closed state of the device, based on the position of the obstructing member, and transmit a message over the antenna 407 back to the phone or watch indicating that the laptop camera is indeed working or is closed.

In some cases, the magnet 403 is an electromagnet. As such, the magnetic fields of the electromagnet can be generated when an electric current is applied. Such an electromagnet could be positioned such that when electrical current is running through the magnet, the ferromagnetic obstructing member would slide to the open position, allowing the camera 401 to receive light, and when no current is running through the electromagnet, the obstructing member 402 would slide to the closed position. Other electromagnet configurations may also be used, including providing multiple electromagnets on the same device. The electromagnet may be powered using the battery 409 or some other power source, and may be initialized according to an incoming signal received on the antenna 407.

The structural housing 404 of the camera obstructing device may be affixed to the electronic device using an adhesive that is optimized for adherence to devices. For instance, if the camera obstructing device is made of plastic, and the electronic device is made of plastic or metal, the adhesive used to attach the structural housing 404 to the electronic devices may be one that is designed to bind plastic to plastic or metal. Similarly, if the camera obstructing device is made of metal, and the electronic device's surface is made of glass, the adhesive used may be designed to bind metal to glass, and so on. The adhesive may be designed to withstand a wide range of temperatures and environments so that, in the case of wearable devices that are exposed to heat, cold, rain and even submersion, the adhesive will still hold properly.

Figure 5A:
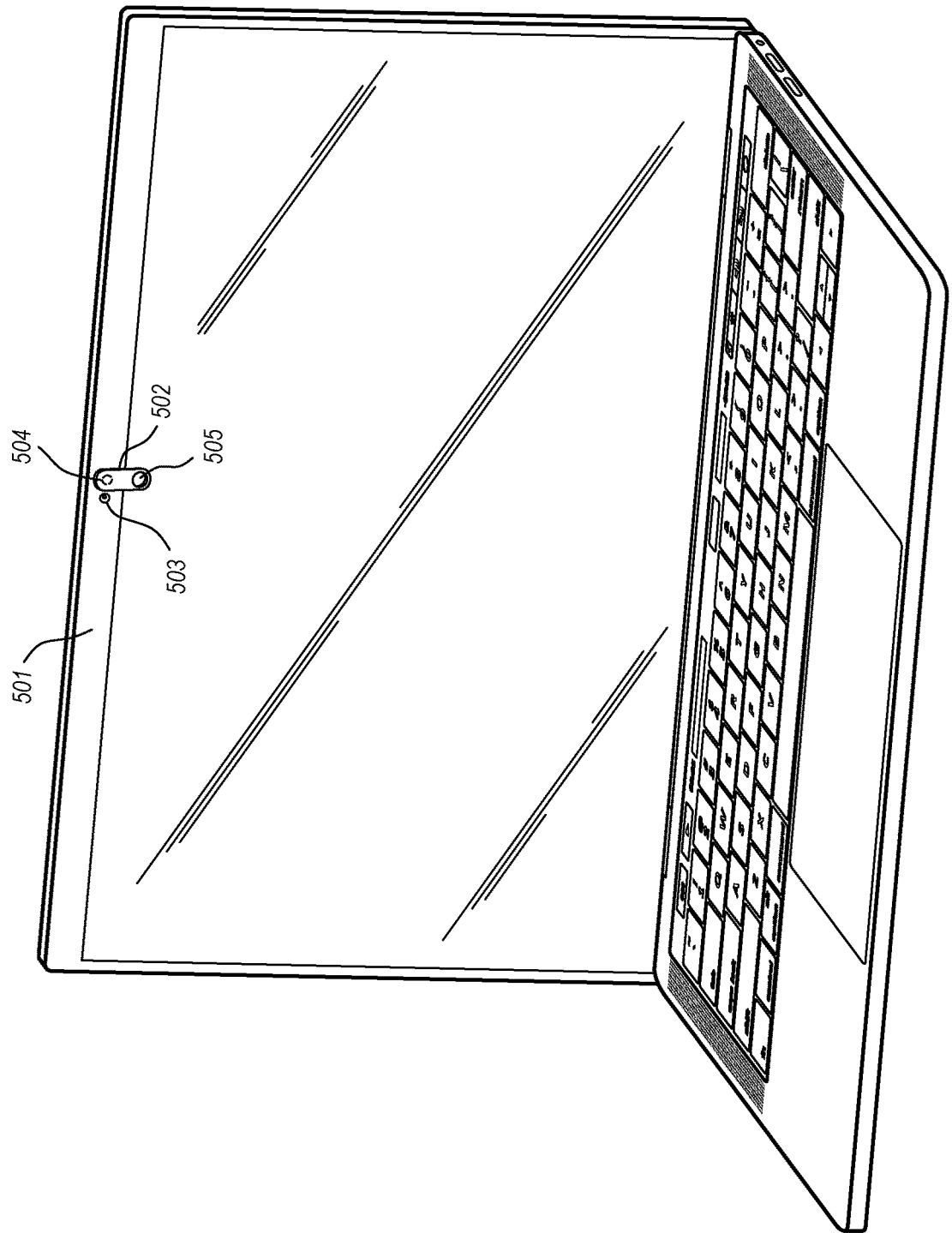
FIG. 5A illustrates an alternative embodiment of a camera obstructing device installed on a laptop computer, where the obstructing member is swiveled to the open position.
Figure 5B:
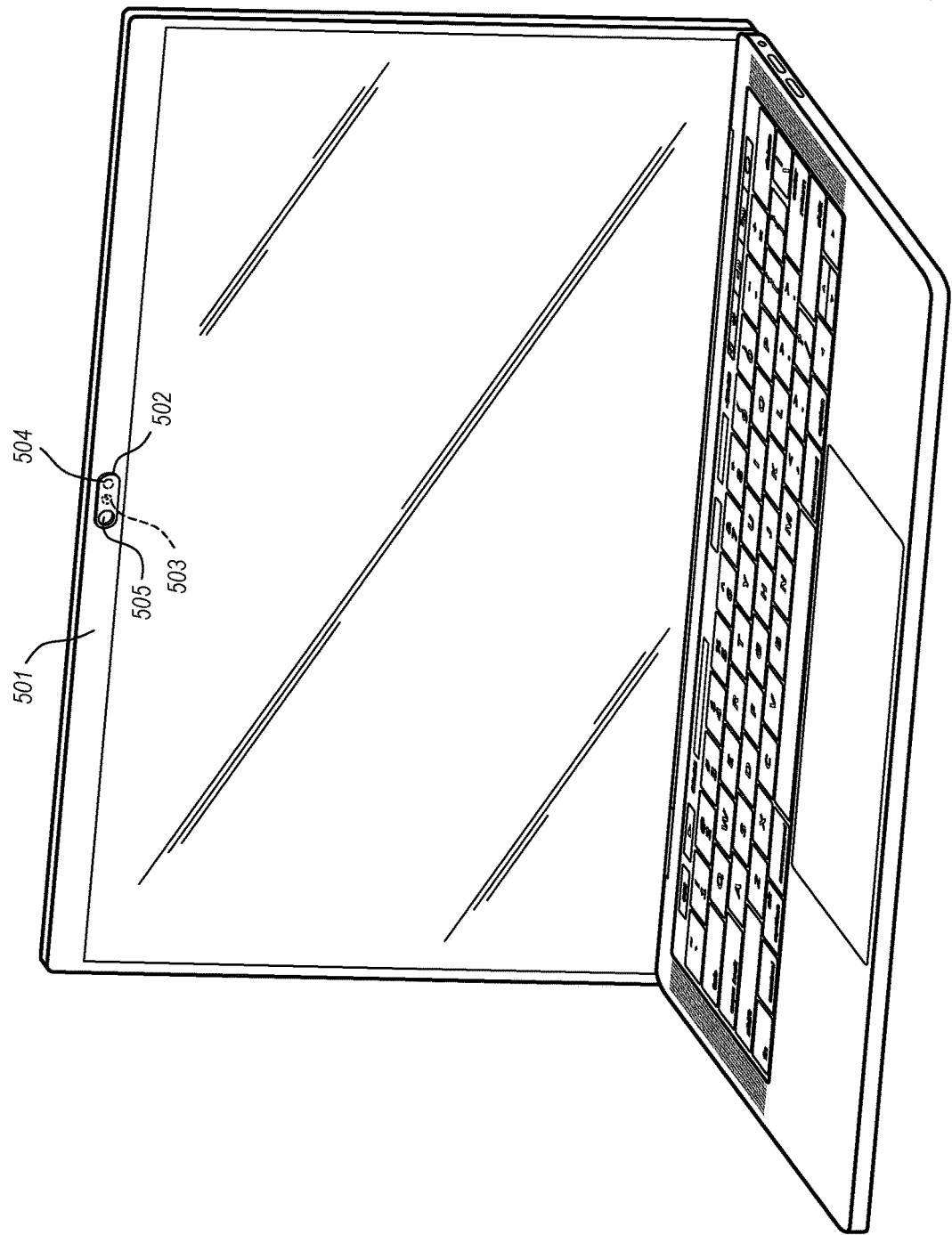
FIG. 5B illustrates an alternative embodiment of a camera obstructing device installed on a laptop computer, where the obstructing member is swiveled to the closed position.

FIG. 5A illustrates an embodiment in which the camera obstructing device is a swivel-based design. The swivel-based device 502 may be attached to a laptop or other electronic device at a rotatable junction 504. The swivel-based device 502, in the down position (FIG. 5A), allows light to reach the camera 503. In the up position (FIG. 5B), the obstructing member 505 substantially prevents light from reaching the camera 503. Optionally, the obstructing member 505 may be slidable along a channel, and may be secured in place using magnets (as described above in FIGS. 2A-3B). Alternatively, the obstructing member 505 may be a solid portion that is not slidable.

FIG. 6 illustrates an embodiment in which a camera obstructing device implements two magnets. The device's support structure 604 holds two magnets 603 and 610. The obstructing member 605 may be oblong shaped, and may slide along channel 606. The use of multiple magnets may be used to hold the obstructing member in different positions. The magnet 603 may hold the obstructing member 605 in place in a first, open position that allows light to reach the camera. The second magnet 610 may hold the obstructing member 605 in a closed position that prevents light from reaching the camera. The magnets may be positioned on opposite sides of the camera, or with both magnets to the side of the camera (as shown). It should be understood that three, four or more magnets may be used in a camera obstructing device, depending on desired design features.

When magnets are used in the camera obstructing devices, the magnets may be coated with a printable material. This printable material allows company's logos or other letters or symbols to be printed thereon. This allows companies to personalize the camera obstructing devices and use the devices as promotional material. Additionally or alternatively, the obstructing members of the camera obstructing devices may be etched using metal etching techniques.

FIGS. 7A and 7B illustrate another embodiment of a camera obstructing device 702. The camera obstructing device 702 has a front obstructing member 701 that blocks the camera 703 in the down position (FIG. 7A), and allows light to reach the camera in the up position (FIG. 7B). The camera obstructing device 702 has a structural housing that provides support for the obstructing member 701. The structural housing has a rotatable fastener which fastens the obstructing member 701 to the structural housing. The obstructing member pivots from a closed position in FIG. 7A to an open position in FIG. 7B. The obstructing member 701 prevents light from reaching a light sensor of the camera 703. The embodiment of FIGS. 7A and 7B may not have a magnet. The obstructing member 701 may be held in place due to friction in the rotatable fastener.

In embodiments where the obstructing member is designed to swivel or rotate, the obstructing member may be moved manually (e.g. by a user's hand), or may be moved using an electronically actuated solenoid. Then, upon actuation, the obstructing member swivels from the open position to the closed position, or vice versa. Similar to the sliding embodiments, the swivel or rotating embodiments may also have a battery, solenoid and antenna, along with other components such as a microprocessor configured to determine the current position of the obstructing member and generate messages to communicate that position to users or other recipients.

An antenna may be integrated into the support structure or the obstructing member of the camera obstructing device. The antenna may receive an actuation signal and a relay (also integrated into the device) may be configured to relay the received signal to an electronic actuating means. That electronic actuating means may include a solenoid, an electromagnet, or other means of sliding, swiveling or rotating the obstructing member. One or more magnets may be used to hold the obstructing member at different positions on the camera obstructing device. Some or all of the magnets may be electromagnets which are designed to create a magnetic field when a current is applied. Thus, use of an electronic actuating means may allow the camera of an electronic device to be open or blocked, simply by sending a signal to the electronic actuating means.

Figure 8:
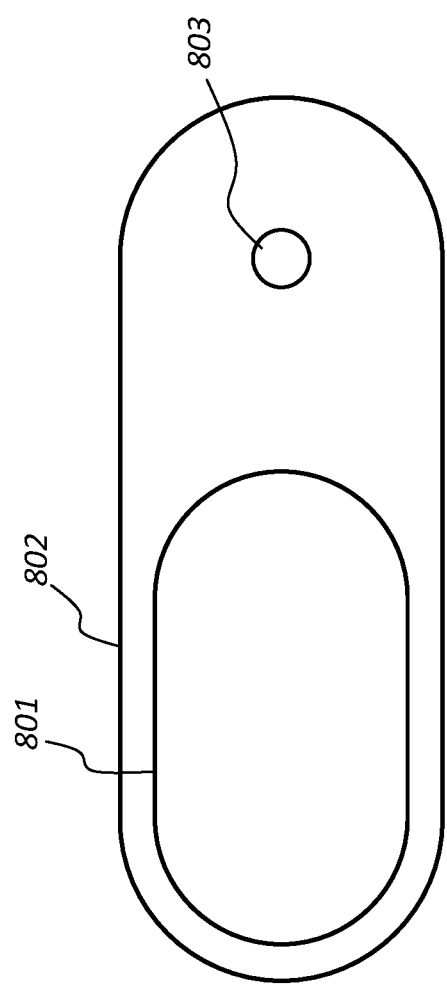
FIG. 8 illustrates a substantially flat embodiment of a magnetic camera obstructing device in the open position.

In some embodiments, as shown in FIG. 8, a substantially flat camera obstructing device may be provided. The device includes a flat structural body 801 that lacks channels or grooves. The flat structural body 801 may be made of a ferrous metal, such that a magnet or an obstructing member 802 that contains a magnet may be magnetically attached thereto. The magnetic obstructing member 802 can slide between open and closed positions, as described above. When in the open position, the camera lens 803 will still receive light, while in the closed position, with the obstructing member 803 slid over the camera lens, no light will reach the lens. In this embodiment, the obstructing member 802 lacks guiding channels and, as such, may be easier to slide between open and closed positions. The above concepts will be explained further below with regard to method 900 of FIG. 9.

Figure 9:
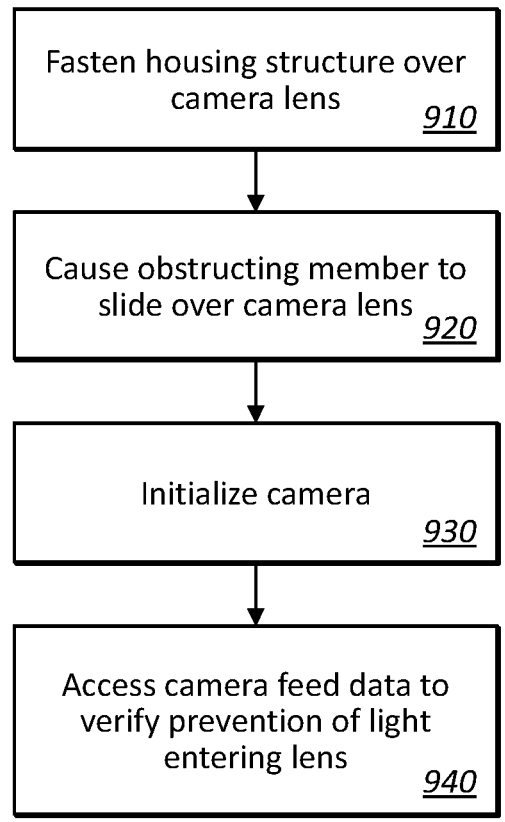
FIG. 9 illustrates a flowchart of an example method for preventing light from reaching a light detecting portion of a camera.

In view of the systems and architectures described above, methodologies that may be implemented in accordance with the disclosed subject matter will be better appreciated with reference to the flow chart of FIG. 9. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 9 illustrates a flowchart of a method 900 for preventing light from reaching a light detecting portion of a camera. The method 900 will now be described with general reference to the components and data of FIGS. 1-8.

Method 900 includes fastening at least a portion of a housing structure over a lens portion of a camera, the housing structure being configured to provide support for an obstructing member, the structural housing having at least one channel on which the obstructing member slides from a first position to a second position (910). For example, the housing structure 104 may be fastened onto the laptop 101 of FIG. 1. The housing structure has an obstructing member 102 that can slide along a channel 106. The channel 106 may be along an inside edge (as shown in FIG. 1), or along an outside edge (as shown in FIG. 2A). The obstructing member 102 slides from an open position over a magnet 103 (where the outside light can reach through the hole 105 to the camera) to a closed position where outside light cannot penetrate to the camera. This prevents operation of the camera, even if it is turned on.

Figure 4B:
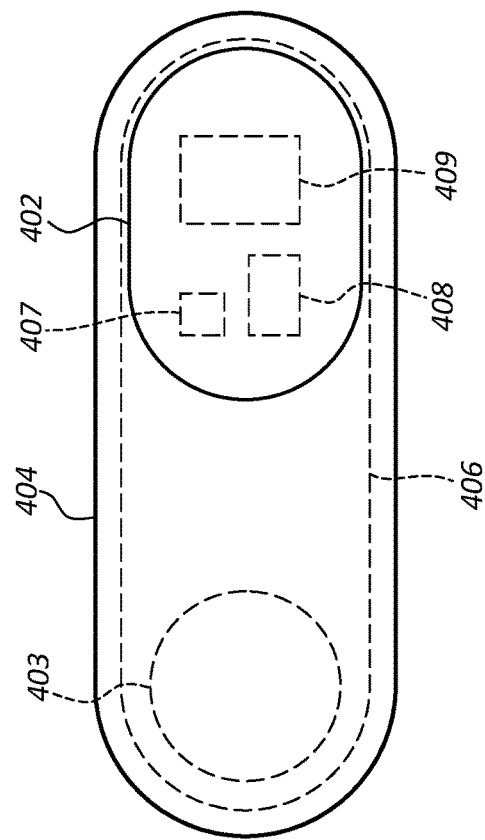
FIG. 4B illustrates an embodiment of a camera obstructing device having an antenna, an actuating member and a battery, where the obstructing member is in the closed position.

Method 900 includes causing the obstructing member to slide on the channel substantially over the lens portion of the camera into the second position (920). As shown in FIGS. 4A and 4B, the camera obstructing device 404 may include a solenoid 408 powered by a battery 409. Upon receiving an actuation signal (e.g. via antenna 407), the solenoid 408 may cause the obstructing member to slide on channel 406 from an open position (FIG. 4A) to a closed position (FIG. 4B) in which the camera is blocked. At this point, the camera may be initialized to begin capturing light at the lens (930). Camera feed data from the electronic device may then be accessed to verify that light is being prevented from reaching the lens portion of the camera (940). For example, if the obstructing member is in the closed position of FIG. 4B, the camera feed data will be substantially black or blank, as light to the camera will be blocked by the obstructing member 402.

As shown in FIG. 4B, the camera obstructing device 404 may include a magnet 403 that locks the obstructing member 402 into place when slid into the open position. A latch or lip may be implemented on the device to hold the obstructing member 402 in place in the closed position. When in place, the obstructing member prevents camera recording even when the camera is turned on. The camera feed data may be analyzed by a user or by a computer algorithm to verify that the camera feed data is not capturing surrounding light. If the verification process fails (i.e. a threshold level of light is detected in the camera feed data), then the user of the electronic device may be notified via a graphical user interface or other indication. The graphical user interface may alert the user that the obstructing member is not in the proper position and that at least some amount of light is still being captured by the camera.

The housing structure may be fastened over the lens of the camera using an adhesive optimized for adherence to electronic devices. Thus, the housing structure 204 of FIG. 2 may be fastened to the laptop 101 of FIG. 1 using an adhesive that attaches well to plastic. Once in position, a user may switch the obstructing member 202 between positions, or a solenoid or other actuating means may be implemented to move the obstructing member between open and closed positions. The solenoid may be powered via a battery or via a wired power source, and may be triggered via a wireless signal or via a wired signal.

Figure 10:
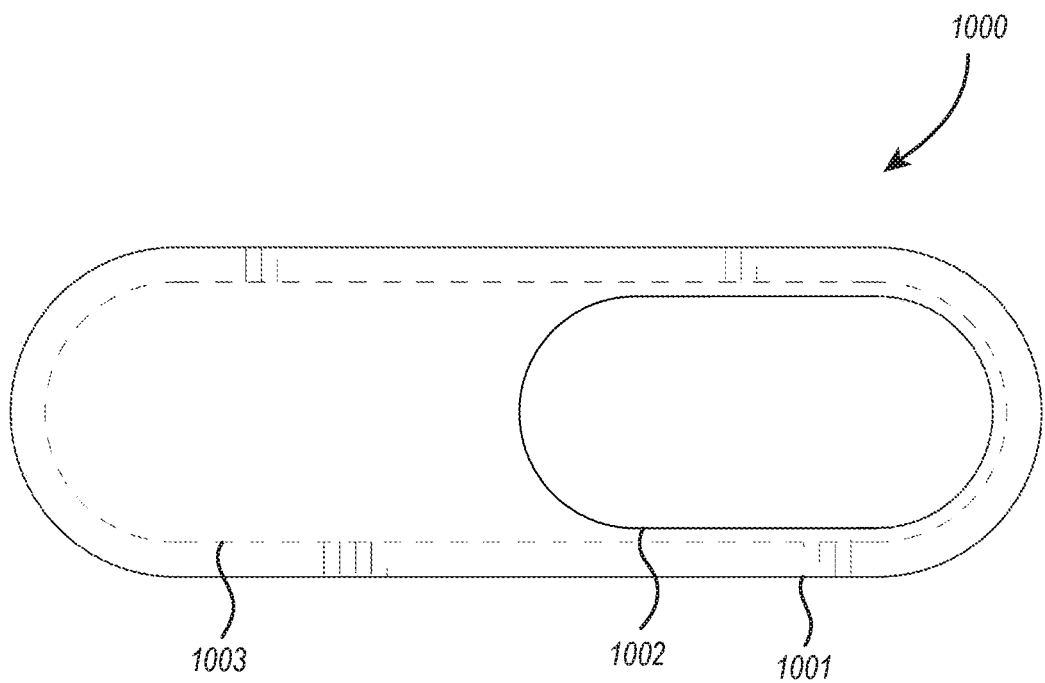
FIG. 10 illustrates an embodiment of a front view of a camera obstructing device having an oblong obstructing member in the closed position.

FIG. 10 illustrates an embodiment of a camera obstructing device 1000 that includes a structural housing 1001 that provides support for an obstructing member 1002. The structural housing 1001 has at least one channel 1003 on which the obstructing member 1002 slides from a first position to a second position. The obstructing member 1002 substantially prevents light from reaching a light sensor of a camera. The obstructing member 1002 contains or is itself a magnet. In embodiments where the structural housing 1001 is made of a ferrous material, the obstructing member 1002 is thus held in place magnetically against the housing. Users can move the obstructing member 1002 from an open position that allows camera use to closed position that prevents camera use.

Figure 11:
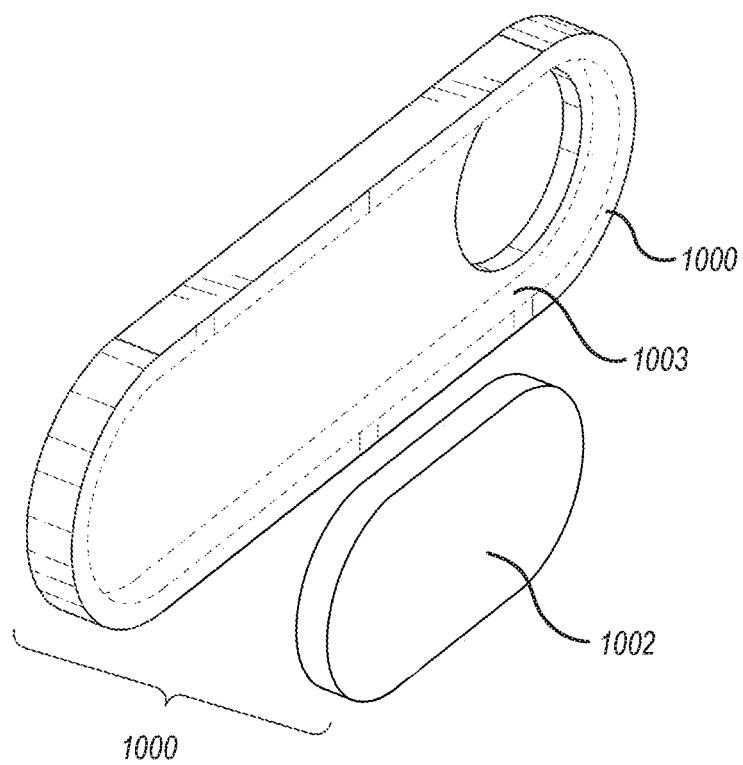
FIG. 11 illustrates an embodiment of an exploded view of a camera obstructing device having an oblong obstructing member in the open position.

FIG. 11 illustrates an exploded, perspective view of the camera obstructing device 1000, including the channel 1003 along which the obstructing member 1002 can be slid from a first, open position (as shown), to a second, closed position.

Accordingly, devices, systems and methods are provided which prevent light from reaching a light detecting portion of a camera. Such functionality prevents malicious users from surreptitiously turning on a user's camera without their knowledge and recording events that the user does not wish to have recorded.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

I claim:

1. A camera obstructing device comprising:
    a structural housing configured to provide support for an obstructing member, the structural housing having at least one channel on which the obstructing member slides from a first position to a second position;
    the obstructing member configured to substantially prevent light from reaching a light sensor of a camera; and
    at least one magnet positioned within the structural housing, the magnet being configured to hold the obstructing member in place in the first position or the second position,
    wherein the at least one magnet is coated with a printable material.

2. The camera obstructing device of claim 1, wherein the first position allows light to reach the light sensor of the camera.

3. The camera obstructing device of claim 1, wherein the second position prevents light from reaching the light sensor of the camera.

4. The camera obstructing device of claim 1, wherein the at least one magnet holds the obstructing member within the channel.

5. The camera obstructing device of claim 1, wherein the magnet is contained within the obstructing member.

6. The camera obstructing device of claim 1, further comprising a solenoid configured to actuate the obstructing member, moving the obstructing member from the first position to the second position.

7. The camera obstructing device of claim 6, further comprising an antenna configured to receive wireless signals, the solenoid being triggered upon receiving a specified signal at the antenna.

8. The camera obstructing device of claim 6, further comprising a battery configured to provide power to the solenoid.

9. A method for preventing light from reaching a light detecting portion of a camera, the method comprising:
    fastening at least a portion of a housing structure over a lens portion of a camera, the housing structure being configured to provide support for an obstructing member, the structural housing having at least one channel on which the obstructing member slides from a first position to a second position;
    causing the obstructing member to slide on the channel substantially over the lens portion of the camera into the second position;
    initializing the camera to begin capturing light at the lens; and
    accessing camera feed data to verify that light is being prevented from reaching the lens portion of the camera;
    wherein:
        the obstructing member is actuated via a solenoid that is powered via a battery; and
        the solenoid is triggered via a wireless signal.

10. The method of claim 9, wherein the obstructing member prevents camera recording even when the camera is turned on.

11. The method of claim 9, wherein the housing structure is fastened over the lens of the camera using an adhesive optimized for adherence to electronic devices.

12. The method of claim 9, wherein the obstructing member locks into place when slid into the second position.

13. A camera obstructing device comprising:
    a structural housing configured to provide support for an obstructing member, the structural housing having at least one rotatable fastener which fastens the obstructing member to the structural housing, and on which the obstructing member pivots from a first position to a second position;
    the obstructing member configured to prevent light from reaching a light sensor of a camera; and
    at least one magnet positioned within the structural housing, the magnet being configured to hold the obstructing member in place in the first position;
    wherein the structural housing is affixed to an electronic device using a specified adhesive optimized for adherence to electronic devices.

14. The camera obstructing device of claim 13, wherein the obstructing member is electronically actuatable, such that upon actuation, the obstructing member swivels from the first position to the second position.

15. The camera obstructing device of claim 14, further comprising an antenna configured to receive an actuation signal and a relay configured to relay the received signal to an electronic actuating means.

16. The camera obstructing device of claim 13, wherein the magnet is contained within the obstructing member.

17. The camera obstructing device of claim 13, wherein the magnet is coated with a printable material.

18. A camera obstructing device comprising:
    a structural housing configured to provide support for an obstructing member, the structural housing having at least one rotatable fastener which fastens the obstructing member to the structural housing, and on which the obstructing member pivots from a first position to a second position;
    the obstructing member configured to prevent light from reaching a light sensor of a camera; and at least one magnet positioned within the structural housing, the magnet being configured to hold the obstructing member in place in the first position;

wherein the magnet is coated with a printable material.

19. The camera obstructing device of claim 18, wherein the obstructing member is electronically actuatable, such that upon actuation, the obstructing member swivels from the first position to the second position.

20. The camera obstructing device of claim 19, further comprising an antenna configured to receive an actuation signal and a relay configured to relay the received signal to an electronic actuating means.

21. The camera obstructing device of claim 18, further comprising a second magnet that holds the obstructing member in place in the second position.

\* \* \* \* \*